US006963968B2

(12) United States Patent
Kori

(10) Patent No.: US 6,963,968 B2
(45) Date of Patent: Nov. 8, 2005

(54) SIGNAL TRANSMISSION DEVICE AND METHOD

(75) Inventor: Teruhiko Kori, Kanagawa (JP)

(73) Assignee: Sony Corporation, Tokyo (JP)

( * ) Notice: Subject to any disclaimer, the term of this patent is extended or adjusted under 35 U.S.C. 154(b) by 1160 days.

(21) Appl. No.: 09/801,459

(22) Filed: Mar. 8, 2001

(65) Prior Publication Data

US 2001/0036193 A1 Nov. 1, 2001

(30) Foreign Application Priority Data

Mar. 8, 2000 (JP) .......................... P2000-064093

(51) Int. Cl.[7] ................................ G06F 13/00

(52) U.S. Cl. ........................ 713/1; 710/11; 710/100; 710/107; 707/104.1; 375/240.25

(58) Field of Search ........................ 713/1; 710/11, 710/100, 107; 707/104.1; 375/240.25

(56) References Cited

U.S. PATENT DOCUMENTS 5,061,991 A * 10/1991 Guichard et al. ...... 375/240.25
6,073,186 A * 6/2000 Murray et al. ................ 710/11
6,253,207 B1 * 6/2001 Malek et al. ............ 707/104.1
6,430,634 B1 * 8/2002 Mito .......................... 710/100
6,487,620 B1 * 11/2002 Grosshog et al. ........... 710/107

FOREIGN PATENT DOCUMENTS

JP 407311342 A * 11/1995 .......... G02B 21/00

* cited by examiner

*Primary Examiner*—A. Elamin
(74) *Attorney, Agent, or Firm*—Bell, Boyd & Lloyd LLC

(57) ABSTRACT

A signal transmission device and method wherein the signal transmission device includes a first communication part for transmitting a signal through a number of high-speed serial buses, and a second communication part for transmitting a signal through a low-speed serial bus having a transmission speed lower than that of the high-speed serial buses; each signal transmission device is disposed on the terminal side of a transmission line which is configured of the number of high-speed serial buses and the low-speed serial bus, and a signal transmitting operation through the high-speed serial buses is controlled on the basis of the result of communications through the low-speed serial bus.

16 Claims, 7 Drawing Sheets

SIGNAL TRANSMISSION DEVICE AND METHOD

BACKGROUND OF THE INVENTION

1. Field of the Invention

The present invention relates, generally, to a signal transmission device and method and, more particularly, to signal transmission where, in case of transmitting signals through a transmission line which is configured of a number of high-speed serial buses and a low-speed serial bus having a transmission speed lower than that of the high-speed serial buses, the operation of signal transmission through the number of high-speed serial buses is controlled on the basis of the result of communications through the low-speed serial bus.

2. Description of the Prior Art

It has been common practice that a computer device or the like converts a digital picture signal into an analog picture signal which is fed to a display device by analog transmission. However, with the spread of a display device in which a display unit is driven using a digital signal, such as a liquid crystal display, for example, a method in which a picture signal is transmitted as a digital signal has been standardized for the purposes of preventing the degradation of a picture quality, the curtailment of (a cost, etc. By way of example, DVI (Digital Visual Interface, Version 1.0) standards have been stipulated by the DDWG (Digital Display Working Group). According to the DVI standards, a digital picture signal is transmitted using a TMDS (Transition Minimized Differential Signals) link developed by Silicon Image, Inc. in the U.S. The interface is provided data transmission lines for the respective channels of red, green and blue and a clock transmission line of one channel, and the picture signals of the respective channels of red, green and blue are transmitted with a baseband. In addition, the interface includes an I2C bus being a bidirectional serial transmission line which has a transmission speed lower than that of the high-speed serial buses of the TMDS link. The I2C bus is employed as a transmission line for DDC (Display Data Channel) standards for a plug-and-play function as stipulated by the VESA (Video Electronics Standards Association).

Meanwhile, the connection scheme of the DVI standards is such that transmission equipment such as a computer device, and reception equipment such as a display device, are connected in point-to-point fashion. Thus, the picture signals of the respective channels of red, green and blue are digitally transmitted unidirectionally from the transmission equipment to the reception equipment and at high speed with the baseband by the use of the TMDS link. Herein, an audio signal, a data signal, etc. cannot be transmitted at high speed. Besides, owing to the plug-and-play function, it is set whether the digital picture signal is to be transmitted using the data transmission lines of the six channels of the TMDS channel or to be transmitted using the data transmission lines of the three channels thereof. Herein, when the transmission of the digital picture signal is set so as to use the data transmission lines of the three channels, the data transmission lines of the remaining three channels fall into reserved states, wherein the data transmission lines are not effectively utilized. Further, the respective picture signals of red, green and blue are transmitted in conformity with GTF (Generalized Timing Formula) stipulated by the VESA. Herein, since a blanking period is held in the GTF standards, transmission efficiency is not yet sufficiently high even in the transmission of the digital signal.

SUMMARY OF THE INVENTION

A object of the present invention, therefore, is to provide, in a connection scheme wherein a number of high-speed serial buses and a low-speed bus having a transmission speed lower than that of the high-speed serial buses are combined with an identical connector, a data transmission device and a data transmission method which can efficiently transmit signals.

A further object of the present invention is to provide a signal transmission device which transmits signals through a transmission line that is configured of a number of high-speed serial buses, and a low-speed serial bus having a transmission speed lower than that of the high-speed serial buses; including a first communication part for transmitting at least one signal through the number of high-speed serial buses; and a second communication part for transmitting a signal through the low-speed serial bus; the second communication part controlling a signal transmitting operation of the first communication means on the basis of a result of communications through the low-speed serial bus.

Yet another object of the present invention is to provide a signal transmission method which includes the steps of preparing at least two signal transmission devices, each of which includes a first communication part for transmitting at least one signal through a number of high-speed serial buses, and a second communication part for transmitting a signal through a low-speed serial bus having a transmission speed lower than that of the high-speed serial buses; disposing the signal transmission devices on respective terminal sides of a transmission line which is configured of the number of high-speed serial buses and the low-speed serial bus; and controlling a signal transmitting operation through the high-speed serial bus, on the basis of a result of communications through the low-speed serial bus.

According to the present invention, in the case where signals are transmitted through a transmission line which is configured of a number of high-speed serial buses and a low-speed serial bus having a transmission speed lower than that of the high-speed serial buses, the signal transmitting directions of the high-speed serial buses are independently set on the basis of the result of communications through the low-speed serial bus, and both a picture signal and a sound signal are transmitted through the different high-speed serial buses. Alternatively, the sound signal is transmitted in the blanking period of the picture signal in multiplexed fashion. Besides, a number of transmission lines can be connected to each signal transmission device. Further, in the case where the opposite signal transmission device has a signal recording function and where a content to be transmitted through the high-speed serial buses is protected by a copyright and has its duplication prohibited, a communicating operation through the high-speed serial buses is inhibited on the basis of the result of communications through the low-speed serial bus.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
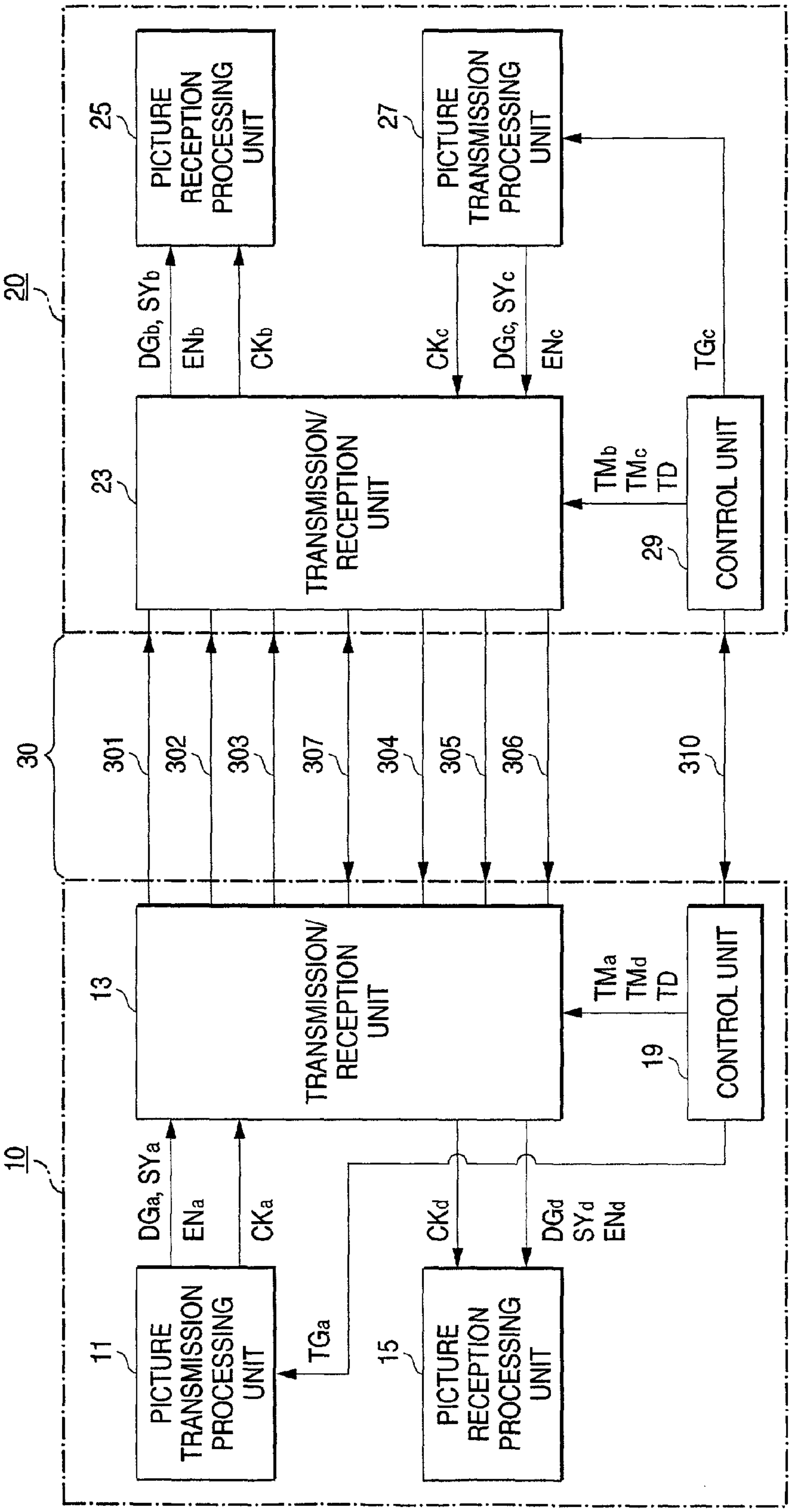
FIG. 1 is a block diagram showing the architecture of a signal transmission system in accordance with a first embodiment of the present invention.

FIG. 1 shows the architecture of a signal transmission system according to a first embodiment of the present invention. A first signal transmission device 10 and a second signal transmission device 20 are connected through a transmission line 30. The transmission line 30 is configured of a number of high-speed serial buses 301–307, and a low-speed serial bus 310 having a transmission speed lower than that of the high-speed serial buses 301–307.

The signal transmission device 10 includes a picture transmission processing unit 11 which generates a picture signal being a content. More specifically, the picture transmission processing unit 11 generates serial picture signals $DG_a$ of three primary colors by adjusting a resolution and the number of colors on the basis of a picture control signal $TG_a$ fed from a control unit 19 to be stated later, and it feeds the generated signals $DG_a$ to a transmission/reception unit 13. Also, a clock signal $CK_a$, horizontal and vertical sync signals SYa, and an enable signal $En_a$ permitting the discrimination between an effective display period and a blanking period, for each of the serial picture signals $DG_a$ of the three primary colors, are fed from the picture transmission processing unit 11 to the transmission/reception unit 13.

Figure 2:
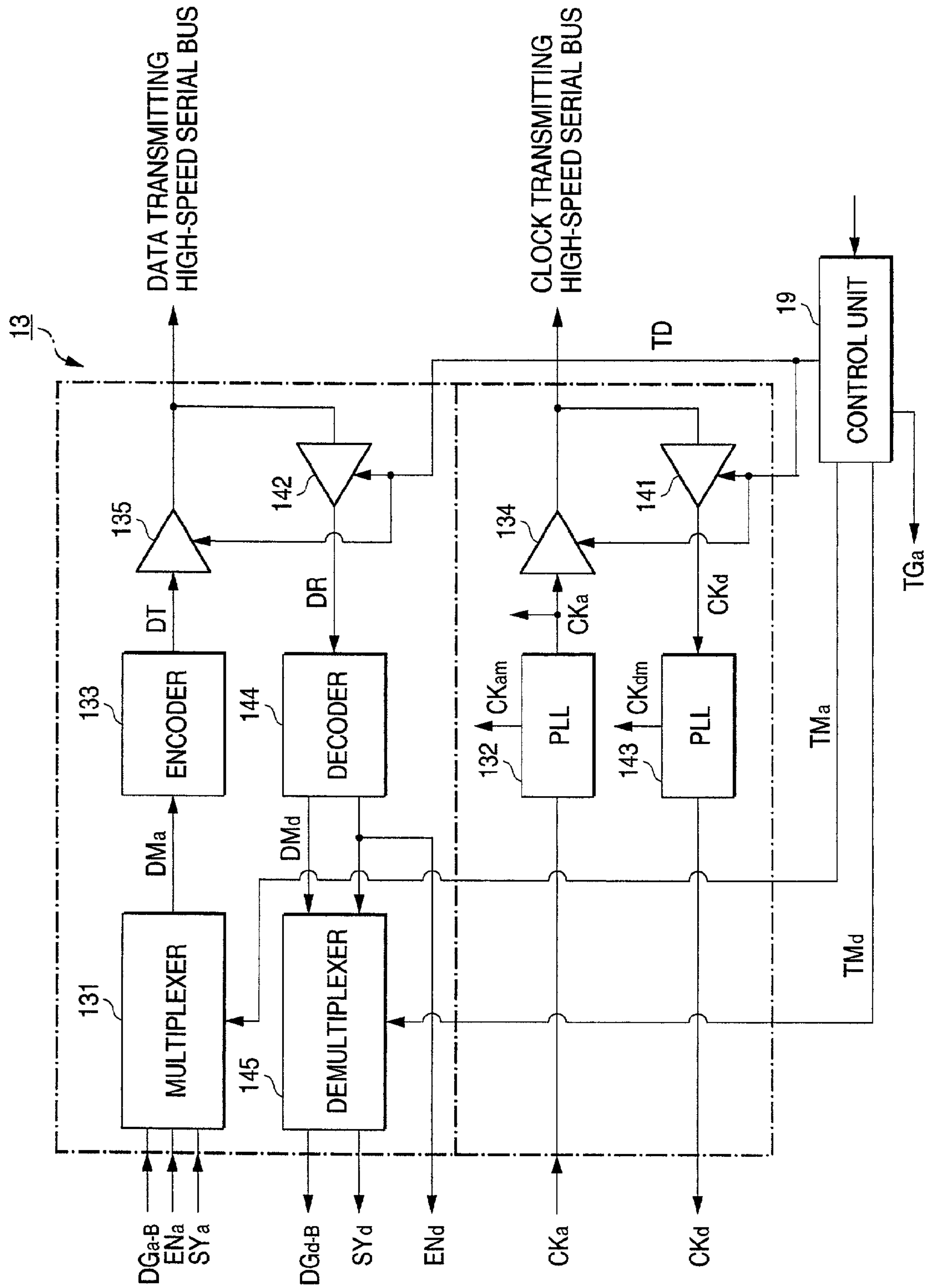
FIG. 2 is a block diagram showing part of a transmission/reception unit which forms another embodiment of the present invention.

Next, the construction of the transmission/reception unit 13 will be explained. In the system shown in FIG. 1, the high-speed serial buses 301–307 of the transmission line 30 consist of the high-speed serial buses 301–306 for use in the data transmissions of six channels as in, for example, a TMDS link, and the high-speed serial bus 307 for use in a clock transmission for transmitting clock signals for signals which are transmitted by the high-speed serial buses 301–306 of the six channels. Therefore, in FIG. 2 showing the construction of the transmission/reception unit 13 which forms another embodiment of the present invention, the data transmitting high-speed serial bus of only one channel and the clock transmitting high-speed serial bus shall be illustrated. Since the data transmitting high-speed serial buses of the other channels are similar to that of the illustrated channel, they shall be omitted from the explanation.

A serial picture signal to-be-transmitted corresponding to one of the three primary colors, for example, a blue serial picture signal $DG_{a-B}$ and the enable signal $EN_a$ are fed to a multiplexer 131, while the clock signal $CK_a$ is fed to a PLL circuit 132. Besides, the sync signals $SY_a$ are fed to the multiplexer 131 which is fed with the blue serial picture signal $DG_{a-B}$.

Here, the serial picture signal is transmitted in conformity with GTF or Monitor Timing Specifications stipulated by the VESA, and a blanking period is held in such standards. In the multiplexer 131, therefore, a multiplexed signal $DM_a$ is generated in such a way that the blue serial picture signal $DG_{a-B}$ and the sync signals $SY_a$ are respectively selected in the effective display period and the blanking period in time-division fashion on the basis of the enable signal $EN_a$. The multiplexed signal DMa generated by the multiplexer 131 is fed to an encoder 133. Incidentally, whether or not the multiplexed signal $DM_a$ is generated by the multiplexer 131 is controlled by an operation control signal $TM_a$ fed from the control unit 19.

The PLL circuit 132 generates a reference signal $CK_{am}$ synchronized with the clock signal $CK_a$, and feeds the generated signal to the encoder 133. Besides, it feeds the fed clock signal CKa to transmitters 134 and 135.

The encoder 133 generates a transmission signal DT after balancing the D.C. level of the multiplexed signal $DM_a$ fed from the multiplexer 131 and minimizing the number of times of the inversions of the logic levels of this multiplexed signal $DM_a$, and it feeds the generated signal to the transmitter 135. Incidentally, the generation of the transmission signal DT is done at a timing based on the reference signal $CK_{am}$.

The transmitters 134, 135 have their output sides connected with the transmission line 30, and are fed with a transmission/reception control signal TD from the control unit 19. In the respective transmitters 134 and 135, whether or not the clock signal $CK_a$ fed from the PLL circuit 132 and the transmission signal DT fed from the encoder 133 are outputted to the side of the transmission line 30 is controlled on the basis of the fed transmission/reception control signal TD. Incidentally, the output processing of the transmission signal DT is done at a timing based on the clock signal $CK_a$.

The input side of a receiver 141 is connected to the output side of the transmitter 134, while the input side of a receiver 142 is connected to the output side of the transmitter 135. The receivers 141, 142 are also fed with the transmission/reception control signal TD. Thus, when the transmission signal DT and the clock signal $CK_a$ are being outputted from the respective transmitters 134 and 135, the receiving operations of the receivers 141, 142 are stopped, and when the transmitting operations of the transmitters 134, 135 are held stopped, the receiving operations of the receivers 141, 142 are permitted. In addition, when the output sides of the transmitters 134, 135 and the input sides of the receivers 141, 142 are held in high impedance states by the transmission/reception control signal TD, the transmitting operations and the receiving operations are both stopped.

The receiver 141 receives a clock signal $CK_a$ fed through the transmission line 30, and feeds the received signal to a PLL circuit 143. Besides, the receiver 142 receives a transmission signal DR fed through the transmission line 30, and it feeds the received signal to a decoder 144.

The PLL circuit 143 generates a reference signal $CK_{dm}$ synchronized with the clock signal $CK_d$ fed from the receiver 141, and feeds the generated signal to the decoder 144. In addition, it outputs the fed clock signal $CK_d$ from the transmission/reception unit 13.

The decoder 144 executes decode processing for the transmission signal DR received by the receiver 142. In the decode processing, the transmission signal DR subjected to the balancing of a D.C. level and the minimization of the number of times of the inversions of logic levels is restored to an original signal. The multiplexed signal $DM_d$ obtained by the decode processing is fed to a demultiplexer 145. Further, the decoder 144 generates an enable signal $EN_d$ which permits the discrimination between the effective display period and blanking period of the multiplexed signal $DM_d$, and which is fed to the demultiplexer 145 and is outputted from the transmission/reception unit 13. Incidentally, the decode processing of the transmission signal DR and the generation of the enable signal $EN_d$ in the decoder 144 are done at timings based on the reference signal $CK_{dm}$ fed from the PLL circuit 143.

The demultiplexer 145 separates the multiplexed signal $DM_d$ into the signal of the effective display period and that of the blanking period on the basis of the enable signal $EN_d$, and outputs the separated signals from the transmission/reception unit 13. Herein, the signal of the effective display period is outputted as a serial picture signal $DG_d$, and the signal of the blanking period is outputted as sync signals $SY_d$ on condition that the serial picture signal $DG_d$ is a blue serial picture signal $DG_{d-B}$. In this manner, the transmission/reception unit 13 can transmit the serial picture signals DG and the clock signals CK bidirectionally through the transmission line 30.

The serial picture signal $DG_d$, sync signals $SY_d$ and clock signal $CK_d$ which are outputted from the transmission/reception unit 13, are fed to a picture reception processing unit 15 as shown in FIG. 1. The picture reception processing unit 15 presents the picture display, etc. of a content on the basis of the serial picture signals $DG_d$ of the three primary colors, the clock signals $CK_d$, the sync signals $SY_d$, etc. fed thereto.

The control unit 19 communicates with the control unit 29 of the signal transmission device 20 through the low-speed serial bus 310 of the transmission line 30 so as to decide the sort of this signal transmission device 20 and to generate a picture control signal $TG_a$ on the basis of the result of the decision. The picture control signal $TG_a$ is fed to the picture transmission processing unit 11, whereby the resolution and the number of colors of a digital serial picture signal DG to be generated by this picture transmission processing unit 11 are adjusted in adaptation to the signal transmission device 20. Besides, the control unit 19 generates operation control signals $TM_a$ and $TM_d$ so as to control the operations of the multiplexer 131 and the demultiplexer 145, respectively. Further, it generates the transmission/reception control signal TD and feeds the generated signal to the transmission/reception unit 13 so as to set the signal transmitting directions of the high-speed serial buses 301–307.

The signal transmission device 20 connected with the signal transmission device 10 through the transmission line 30 includes a transmission/reception unit 23 constructed similarly to the transmission/reception unit 13, and it is connected with the transmission line 30 through this transmission/reception unit 23.

A serial picture signal $DG_b$ of the three primary colors, sync signals $SY_b$, etc. outputted from the decoder of the transmission/reception unit 23, and a clock signal $CK_b$ outputted from the PLL circuit thereof are fed to a picture reception processing unit 25. The picture reception processing unit 25 presents the picture display, etc. of a content likewise to the picture reception processing unit 15.

Also, likewise to the picture transmission processing unit 11, a picture transmission processing unit 27 generates a serial picture signal $DG_c$ of the three primary colors, sync signals $SY_c$ and an enable signal $EN_c$ and feeds the generated signals to the encoder of the transmission/reception unit 23, so as to generate a transmission signal. Besides, the picture transmission processing unit 27 generates a clock signal $CK_c$ and feeds the generated signal to the PLL circuit of the transmission/reception unit 23, so as to transmit the transmission signal and the clock signal $CK_c$ to the signal transmission device 10 through the transmission line 30.

In this manner, when the signal transmission devices 10 and 20 which are constructed as if the signal transmitting direction of the TMDS link is made bidirectional are connected with each other, the communications between the control unit 19 of the signal transmission device 10 and that 29 of the signal transmission device 20 are permitted through the low-speed serial bus 310 by a plug-and-play function. The type, model, etc. of the opposite signal transmission device are decided owing to the communications, and the resolution and the number of colors of the serial picture signal DG to be generated by the picture transmission processing unit 11 or 27 are adjusted in adaptation to the opposite signal transmission device. In addition, the clock signal CK, sync signals SY, etc. corresponding to the serial picture signal DG are generated.

Here, the transmission/reception unit 13 of the signal transmission device 10 and that 23 of the signal transmission device 20 are capable of the bidirectional communications through the high-speed serial buses 301–307 as explained above. Therefore, when the signal transmitting direction of each high-speed serial bus is controlled by the transmission/reception control signal TD from the control unit 19 or 29, the picture signal of a content can be fed from the signal transmission device 10 to the signal transmission device 20, while at the same time, the picture signal of a content can be fed from the signal transmission device 20 to the signal transmission device 10. Accordingly, the transmission line 30 can be applied for connecting equipment which is capable of not only the unidirectional transmission between a computer device and a monitor device as in the known interface of the DVI standards but also the inputting and outputting of picture signals just as a video record/playback device.

The case of transmitting the picture signal has been described in the above aspect of performance. In this regard, when the high-speed serial buses 301–306 are employed for transmitting the data of six channels as in the TMDS link, a picture signal can be transmitted using only the high-speed serial buses of one link (three channels) on condition that the picture signal to be transmitted has a small quantity of data.

Figure 3:
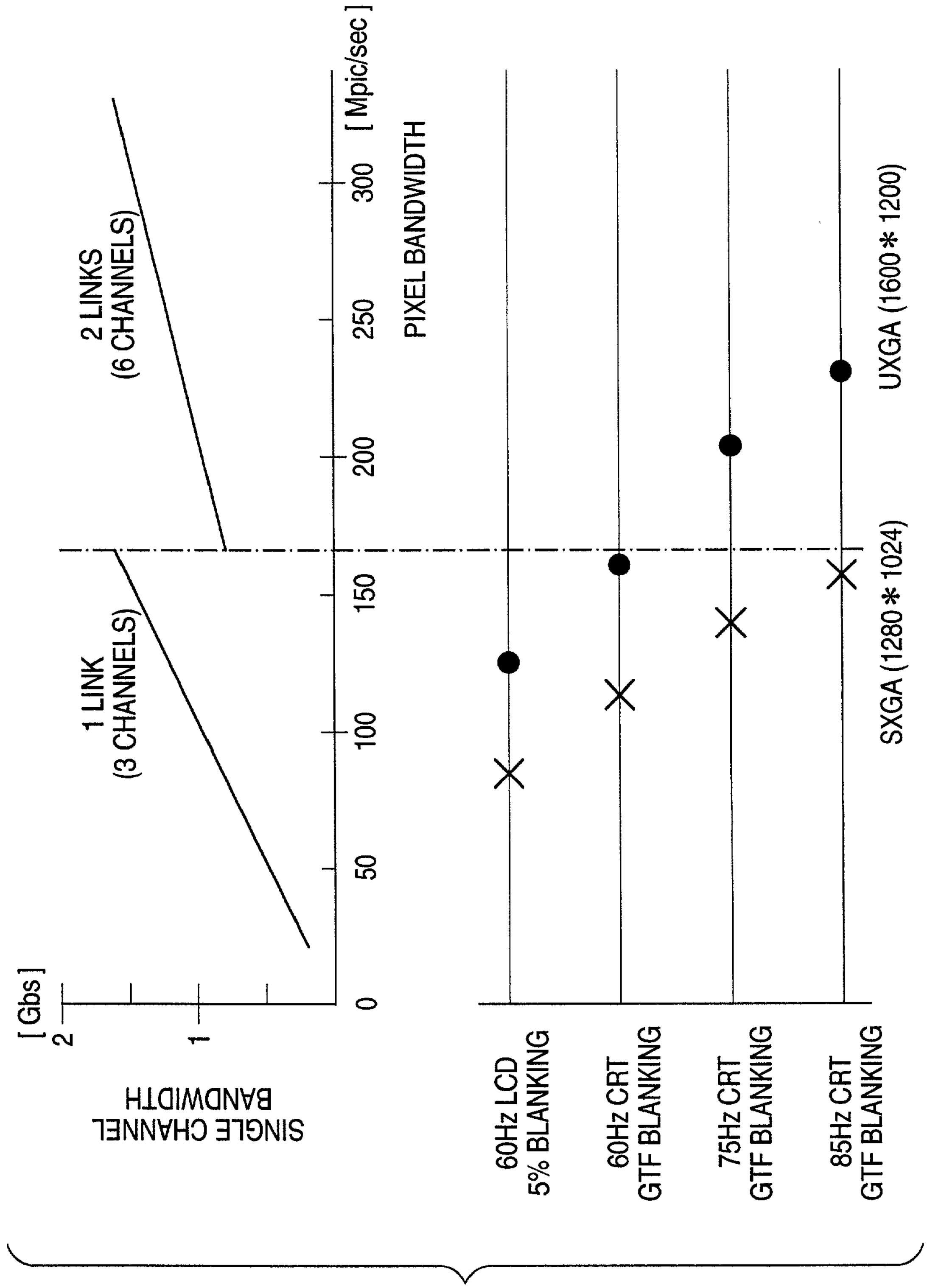
FIG. 3 is a diagram showing the bandwidths of a TMDS link according to the present invention.

FIG. 3 shows the bandwidths of the TMDS link at its upper part. The axis of abscissas represents the pixel bandwidth of 0 to 300 [Mpic/sec] every step of 50 [Mpic/sec], while the axis of ordinates represents the single-channel bandwidth of 0 to 2 [Gbs] every step of 0.5 [Gbs].

The lower part of FIG. 3 shows the cases of SXGA (1280*1024) and UXGA(1600*1200) pixels on a horizontal axis in correspondence with the graph of the bandwidths. Also, vertical frequencies and blanking periods in the cases of displaying the pixels on an LCD device and CRT display devices are indicated on a vertical axis.

Suppose, for example, the quantity of data of a picture signal to be transmitted is not larger than about 165 [Mpic/sec]. In case of presenting a picture display with the SXGA (1280 pixels*1024 pixels) size and under the conditions of a vertical frequency of 85 [Hz] and GTF blanking, or in case of presenting a picture display with the UXGA(1600 pixels*1200 pixels) size and under the conditions of a vertical frequency of 60 [Hz] and GTF blanking, a picture signal can be transmitted using the high-speed serial buses of one link (three channels). However, in case of presenting a picture display with the UXGA(1600 pixels*1200 pixels) size and under the conditions of a vertical frequency of 75 [Hz] and GTF blanking or under the conditions of a vertical frequency of 85 [Hz] and GTF blanking, the high-speed serial buses of two links (six channels) are used as shown on the right side of FIG. 3 with respect to a vertical dot-and-dash line corresponding to 165 [Mpic/sec].

In the above case where the picture signal is transmitted using the high-speed serial buses of three channels, a signal different from the picture signal, for example a sound signal may well be transmitted using the remaining high-speed serial buses not used for the picture signal.

Figure 4:
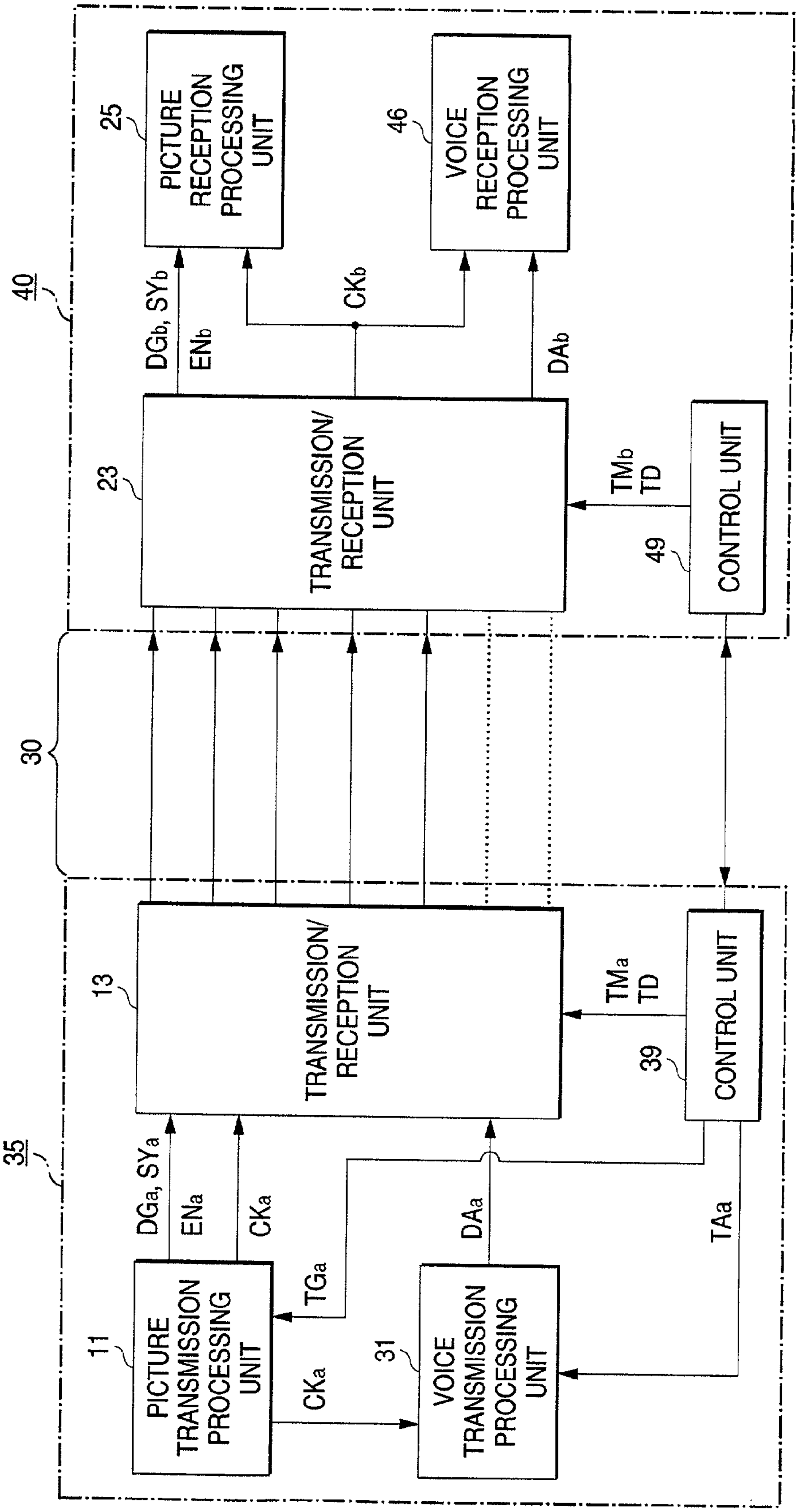
FIG. 4 is a block diagram showing the architecture of a signal transmission system which forms yet another embodiment of the present invention.

FIG. 4 shows an architecture in the case of feeding a picture signal and a sound signal from a signal transmission device 35 to a signal transmission device 40 as forms another embodiment of the present invention. By the way, in FIG. 4, the same symbols are assigned to portions corresponding to those in FIG. 1. In addition, blocks having the same numerals operate similarly to those in FIG. 1.

The signal transmission device 35 includes a picture transmission processing unit 11 and also a sound transmission processing unit 31 which generates a sound signal. The picture transmission processing unit 11 generates serial picture signals $DG_a$, sync signals $SY_a$ and an enable signal $EN_a$, and feeds the generated signals to a transmission/reception unit 13. On the other hand, the sound transmission processing unit 31 generates the sound signal $DA_a$ on the basis of a sound output control signal $TA_a$ fed from a control unit 39 to be explained later, and it outputs the generated signal $DA_a$ to the transmission/reception unit 13 at a predetermined timing. Incidentally, the generation of the sound signal $DA_a$ by the sound transmission processing unit 31 is done at the timing based on a clock signal $CK_a$ which is fed from the picture transmission processing unit 11 to the sound transmission processing unit 31 so as to be synchronized with the serial picture signals $DG_a$.

The control unit 39 adjusts the picture signal of a content to be transmitted from the signal transmission device 35 to the signal transmission device 40, in adaptation to the signal transmission device 40, on the basis of its communications with the control unit 49 of the signal transmission device 40. Also, the control unit 39 feeds a transmission/reception control signal TD to the transmission/reception unit 13, whereby the signal transmitting directions of four high-speed serial buses for transmitting data and a high-speed serial bus for transmitting a clock are set at the direction from the signal transmission device 35 to the signal transmission device 40.

The transmission/reception unit 13 transmits the serial picture signals $DG_a$ of three primary colors as explained before, through three of the four data-transmitting high-speed serial buses whose signal transmitting directions have been set at the direction from the signal transmission device 35 to the signal transmission device 40. Besides, the unit 13 generates a serial transmission signal of sound by executing encode processing for the sound signal $DA_a$, and it transmits the serial transmission signal through one of the four data-transmitting high-speed serial buses.

The signal transmission device 40 includes a transmission/reception unit 23 constructed similarly to the transmission/reception unit 13, and is connected with a transmission line 30 through the transmission/reception unit 23.

Serial picture signals $DG_b$, sync signals $SY_b$, etc. outputted from the decoder of the transmission/reception unit 23, and a clock signal $CK_b$ outputted from the PLL circuit thereof are fed to a picture reception processing unit 25, by which the picture of the content is displayed. Incidentally, the clock signal CKb is also fed to a sound reception processing unit 46.

A sound signal $DA_b$ outputted from the decoder of the transmission/reception unit 23 is fed to the sound reception processing unit 46. The sound reception processing unit 46 generates an analog sound signal from the sound signal $DA_b$ and the clock signal $CK_b$ fed thereto, and delivers a sound output based on the analog sound signal.

In this manner, the serial picture signals can be transmitted through the three data-transmitting high-speed serial buses, while at the same time, the sound signal is transmitted using the data-transmitting high-speed serial bus which is idle without being used for the transmission of any serial picture signal. Thus, the transmission line 30 can be effectively utilized. Alternatively, since a blanking period is held in such standards as the GTF stipulated by the VESA, as explained before, the sound signal may well be transmitted using the blanking period.

Figure 5:
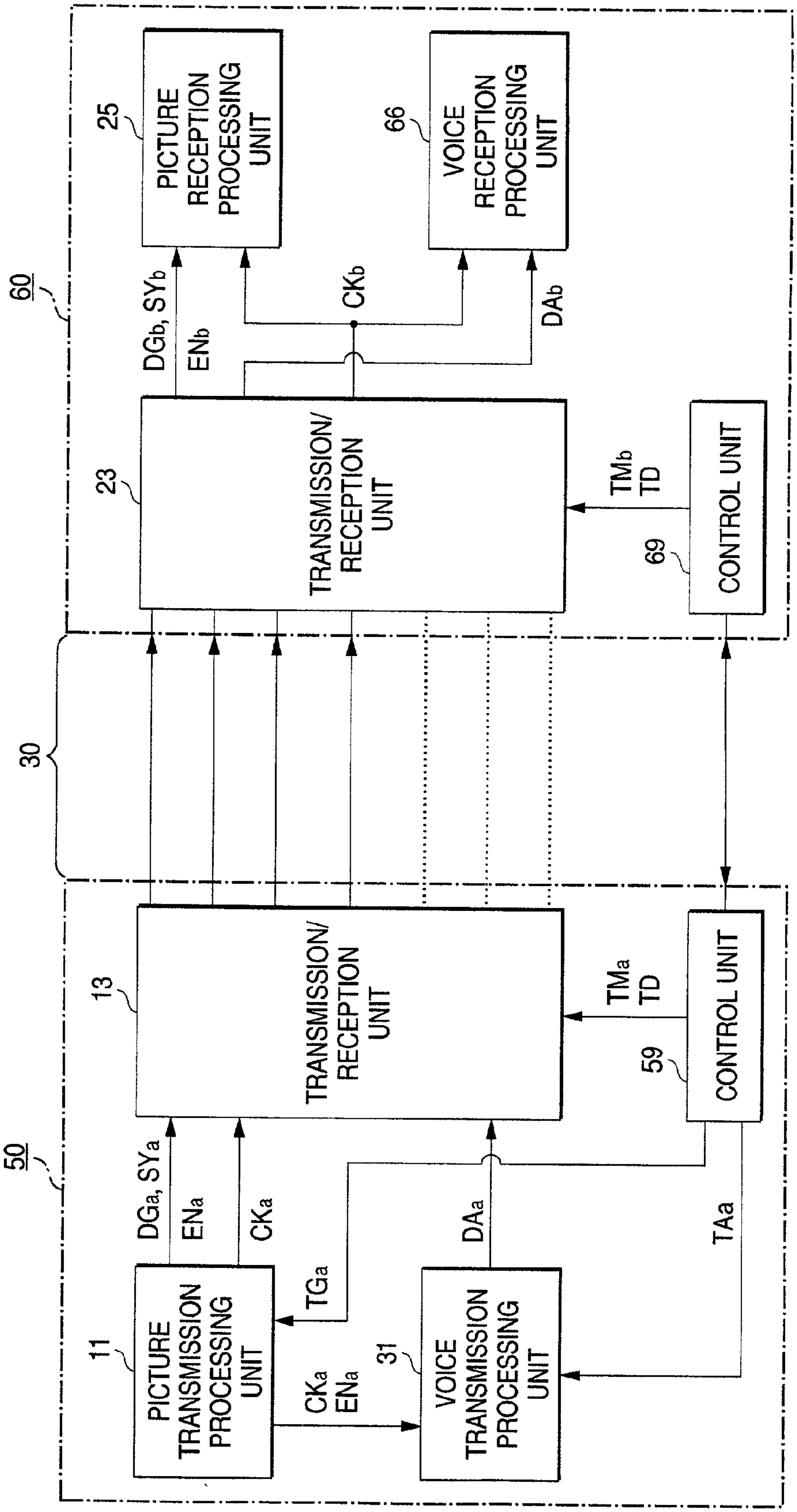
FIG. 5 is a block diagram showing the architecture of a signal transmission system which forms a further embodiment of the present invention.

FIG. 5 shows an architecture in the case of feeding a sound signal from a signal transmission device 50 to a signal transmission device 60 during a blanking period as forms the next embodiment of the present invention. In FIG. 5, the same symbols are assigned to portions corresponding to those in FIGS. 1 and 4. In addition, blocks having the same numerals operate similarly to those in FIGS. 1 and 4.

The signal transmission device 50 includes a picture transmission processing unit 11 and a sound transmission processing unit 31. The picture transmission processing unit 11 generates serial picture signals $DG_a$, sync signals $SY_a$, an enable signal $EN_a$ and a clock signal $CK_a$, and feeds the generated signals to a transmission/reception unit 13. The clock signal $CK_a$ and the enable signal $EN_a$ are also fed to the sound transmission processing unit 31. The sound transmission processing unit 31 generates the sound signal $DA_a$ at a timing based on the clock signal $CK_a$, and feeds the sound signal $DA_a$ to the transmission/reception unit 13 during the blanking period indicated by the enable signal $EN_a$.

Here, a high-speed serial bus for transmitting a blue serial picture signal $DG_{a-B}$ transmits the sync signals $SY_a$ during the blanking period. Therefore, the sound signal $DA_a$ is fed to that multiplexer 131 of the transmission/reception unit 13 which is fed with a red serial picture signal $DG_{a-R}$ or a green serial picture signal $DG_{a-G}$.

Figure 6:
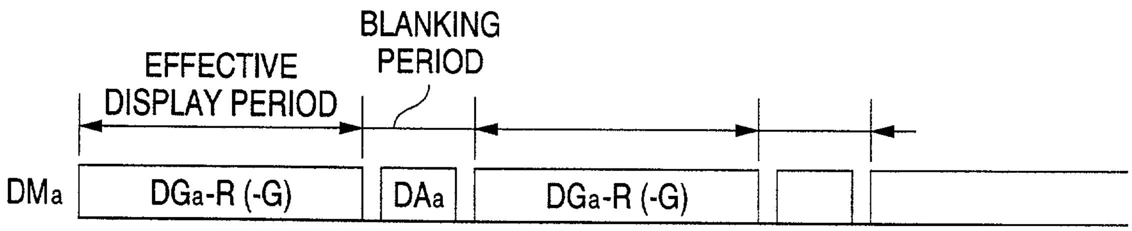
FIG. 6 is a diagram showing the format of a multiplexed signal (DMa) in order to explain the operation of the present invention.

The multiplexer 131 selects either of the serial picture signal $DG_{a-R}$ or $DG_{a-G}$ and the sound signal $DA_a$ on the basis of the enable signal $EN_a$, and generates a multiplexed signal $DM_a$ which is composed of the serial picture signal $DG_{a-R}$ or $DG_{a-G}$ during an effective display period and the sound signal DAa during the blanking period as shown in FIG. 6. The multiplexed signal $DM_a$ composed of the serial picture signal $DG_{a-R}$ or $DG_{a-G}$ and the sound signal $DA_a$ is subjected to encode processing, and is transmitted as a serial transmission signal DT.

The signal transmission device 60 includes a transmission/reception unit 23 constructed similarly to the transmission/reception unit 13. In the transmission/reception unit 23, a multiplexed signal $DM_b$ outputted from its decoder is fed to its demultiplexer, thereby to demultiplex and output a serial picture signal $DG_{b-R}$ or $DG_{b-G}$ and a sound signal $DA_b$. The serial picture signals $DG_b$, sync signals $SY_b$, etc. outputted from the transmission/reception unit 23 are fed to a picture reception processing unit 25, which presents the picture display of a content. Besides, the sound signal $DA_b$ outputted from the transmission/reception unit 23 is fed to a sound reception processing unit 66, which delivers a sound output.

When the sound signal $DA_a$ is transmitted by utilizing the blanking period in this manner, not only the serial picture signals $DG_a$, but also the sound signal $DA_a$ can be transmitted using three high-speed serial buses for data transmissions.

Meanwhile, in the foregoing aspect of performance, the two signal transmission devices are connected through the transmission line 30, and the communications are established between the signal transmission devices. Since, however, the transmission line 30 can transmit signals bidirectionally in spite of the high-speed serial buses unlike the interface of the DVI standards, a network can be built by connecting a number of signal transmission devices through such transmission lines 30.

Figure 7:
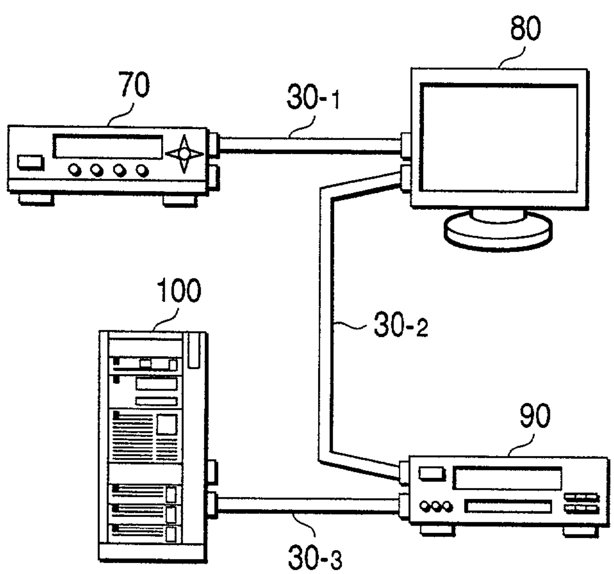
FIG. 7 is a schematic front view showing a network which forms another embodiment of the present invention.

FIG. 7 shows a case where a settop box 70, a monitor device 80, a signal recording/playback device 90 and a computer device 100 are connected into a network, as a network architecture including a number of signal transmission devices as forms another embodiment of the present invention. For the purpose of the network connection, each device has two connectors so that two transmission lines 30 can be connected.

One connector of the monitor device 80 is connected to one connector of the settop box 70 through the transmission line 30-1. One connector of the signal recording/playback device 90 is connected to the other connector of the monitor device 80 through the transmission line 30-2. Further, one connector of the computer device 100 is connected to the other connector of the signal recording/playback device 90 through the transmission line 30-3. In this manner, the devices are brought into a daisy chain connection through the transmission lines 30, whereby the network is built.

In case of such a network architecture, the picture of a content can be displayed on the screen of the monitor device 80 on the basis of three-primary-color serial picture signals of baseband outputted from the settop box 70, while at the same time, the serial picture signals of the baseband can be fed to the signal recording/playback device 90 so as to record the picture of the content on a recording medium. Further, the picture of the content can be easily processed by the computer device 100 in such a way that the serial picture signals of three primary colors having the baseband are fed from the signal recording/playback device 90 to the computer device 100. Since the transmission line 30 is capable of bidirectional transmissions, a computer picture can be recorded on the recording medium by feeding serial picture signals of baseband from the computer device 100 to the signal recording/playback device 90, or it can be displayed by feeding them to the monitor device 80 through the signal recording/playback device 90.

In a case where signals are transmitted between one pair of devices through high-speed serial buses in accordance with the communications between the control units of the respective devices, and where high-speed serial buses connected with the other devices are electrically disconnected, the pair of devices can be operated as in the point-to-point connection in spite of the network connection.

By way of example, in a case where the settop box 70 has received the picture signal of a content protected by a copyright, the control unit of the settop box 70 and that of the monitor device 80 communicate to decide that the device connected to the settop box 70 does not have the function of recording the picture signal, and then the picture signal is transmitted to the monitor device 80 through the high-speed serial buses. When the control unit of the monitor device 80 communicates with that of the signal recording/playback device 90 connected to this monitor device 80, it can be decided that the device connected to the monitor device 80 has the function of recording the signal and, hence, the high-speed serial buses are electrically disconnected; that is, a transmitter and a receiver connected to the transmission line 30-2 are brought into high impedance states. In this case, the picture signal of the content protected by the copyright is not transmitted to the signal recording/playback device 90, and the network can be operated similarly to the point-to-point connection between the settop box 70 and the monitor device 80.

Figure 8:
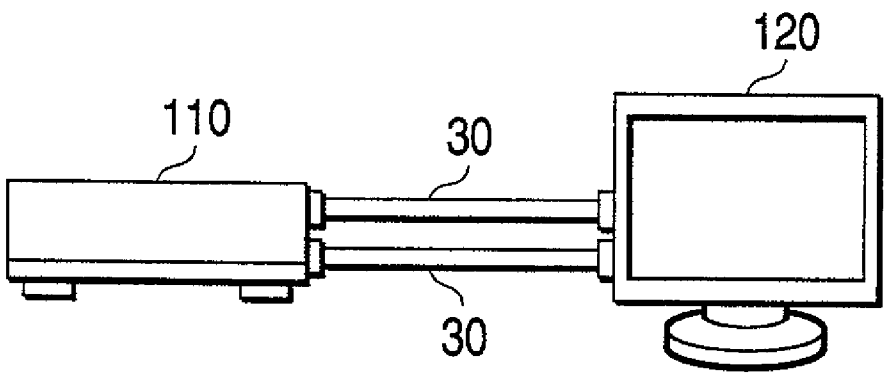
FIG. 8 is a schematic front view showing a point-to-point connection which employs a number of transmission lines and which forms yet another embodiment of the present invention.

Next, a further embodiment of the present invention will be explained. In order to permit a network connection, each of devices is provided with two connectors. As shown in FIG. 8, accordingly, when the devices each having the two connectors are connected in point-to-point fashion, two transmission lines may well be connected using such connectors. In this case, serial picture signals can be transmitted through the two transmission lines and, hence, they can be transmitted with a baseband even when the quantity of data of a picture to be displayed on a monitor device is large as in an air-traffic control system or the like.

It should be noted, although the picture signal and the sound signal are transmitted in the foregoing aspect of performance, signals to be transmitted are not restricted to the picture and sound signals, and various data signals may well be transmitted. The high-speed serial buses are not restricted to the construction in which the signal transmitting direction of the TMDS link is changed to be bidirectional. They may, of course, have a construction in which the transmission line of, for example, the LVDS (Low Voltage Differential Signaling) standards is made bidirectional.

According to the present invention, in case of transmitting signals through a transmission line which is configured of a number of high-speed serial buses and a low-speed serial bus having a transmission speed lower than that of the high-speed serial buses, a signal transmitting operation through the number of high-speed serial buses is controlled on the basis of the result of communications through the low-speed serial bus. Therefore, digital signals of broad band can be transmitted bidirectionally at high speed.

In addition, the signal transmitting directions of the number of high-speed serial buses are independently set on the basis of the result of the communications through the low-speed serial bus. Therefore, while a picture signal, for example, is being transmitted, a sound signal or the like also can be transmitted through the idle high-speed serial bus. Further, a number of kinds of signals are transmitted through the high-speed serial bus in time division fashion. Therefore, even when none of the high-speed serial buses is idle, the sound signal or the like can be transmitted by utilizing the blanking period of the picture signal, and an efficient signal transmission is incarnated.

Further, when each of signal transmission devices is permitted to transmit a signal or signals through a number of transmission lines, a network connection becomes possible. Also, in a case where the signal transmission devices are brought into a point-to-point connection unlike the network connection, they can transmit the signal or signals at high speed by using the number of transmission lines.

Still further, in a case where the opposite signal transmission device has a signal recording function and where a content to be transmitted is protected by a copyright and has its duplication prohibited, the transmission through the high-speed serial buses is inhibited. Therefore, the copyright can be protected, and even the network connection can operate similarly to the point-to-point connection.

Although the present invention has been described with reference to specific embodiments, those of skill in the art will recognize that changes may be made thereto without departing from the spirit and scope of the invention as set forth in the hereafter appended claims.

We claim:

1. A signal transmission device for transmitting signals through a transmission line formed of both a plurality of serial buses of a first transmission speed and a serial bus of a second transmission speed, comprising:

a first communication part for transmitting at least one signal through the plurality of serial buses at the first transmission speed; and a second communication part for transmitting a signal through the serial bus at the second transmission speed;

wherein the second communication part controls a signal transmitting operation of the first communication part based on a result of communications through the serial bus of the second transmission speed.

2. A signal transmission device as claimed in claim 1, wherein signal transmitting directions of the plurality of serial buses of the first transmission speed are independently set by the first communication part based on the result of the communications by the second communication part.

3. A signal transmission device as claimed in claim 1, wherein the first communication part transmits the at least one signal by using the plurality of serial buses of the first transmission speed independently in accordance with kinds of the signals to be transmitted.

4. A signal transmission device as claimed in claim 3, wherein the first communication part transmits both a picture signal and a signal different from the picture signal through different ones of the serial buses of the first transmission speed.

5. A signal transmission device as claimed in claim 1, wherein the first communication part transmits a plurality of kinds of signals using the serial buses of the first transmission speed in time division fashion.

6. A signal transmission device as claimed in claim 5, wherein the first communication part transmits a picture signal through the serial buses of the first transmission speed, and transmits a sound signal by utilizing a blanking period of the picture signal.

7. A signal transmission device as claimed in claim 1, further comprising:

a plurality of the first communication parts and a plurality of the second communication parts, wherein the signals are permitted to be transmitted through a plurality of the transmission lines.

8. A signal transmission device as claimed in claim 1, wherein the second communication part decides that an opposite signal transmission device has a signal recording function, based on the result of the communications, and inhibits a communicating operation of the first communication part when a content to be transmitted has its duplication prohibited by a copyright protection.

9. A signal transmission method, comprising the steps of:

preparing at least two signal transmission devices, each transmission device including both a first communication part for transmitting at least one signal through a plurality of serial buses of a first transmission speed and a second communication part for transmitting a signal through a serial bus of a second transmission speed;

disposing the at least two signal transmission devices on respective terminal sides of a transmission line which is formed of a plurality of serial buses of the first transmission speed and the serial bus of the second transmission speed; and controlling a signal transmitting operation through the serial bus of the first transmission speed, based on a result of communications through the serial bus of the second transmission speed.

10. A signal transmission method as claimed in claim 9, wherein signal transmitting directions in the signal transmitting operations through the plurality of serial buses of the first transmission speed are set independently for the respective serial buses of the first transmission speed, based on the result of the communications through the serial bus of the second transmission speed.

11. A signal transmission method as claimed in claim 9, wherein the plurality of serial buses of the first transmission speed are used independently in accordance with kinds of signals to be transmitted.

12. A signal transmission method as claimed in claim 11, further comprising the step of:

transmitting both a picture signal and a signal different from the picture signal through the plurality of serial buses of the first transmission speed.

13. A signal transmission method as claimed in claim 9, the method further comprising the step of:

transmitting a plurality of kinds of signals using the plurality of serial buses of the first transmission speed in time division fashion.

14. A signal transmission method as claimed in claim 13, the method further comprising the steps of:

transmitting a picture signal through the plurality of serial buses of the first transmission speed; and transmitting a sound signal by utilizing a blanking period of the picture signal.

15. A signal transmission method as claimed in claim 9, wherein each of the at least two signal transmission devices is provided with both a plurality of the first communication parts and a plurality of the second communication parts, and the signals are transmitted through a plurality of the transmission lines.

16. A signal transmission method as claimed in claim 9, wherein, in a case where the signal to be transmitted by one of the at least two signal transmission devices through the serial buses of the first transmission speed includes content protected by a copyright, the transmission of the signal of the content is inhibited when the other of the at least two signal transmission devices has a signal recording function based on the result of the communications through the serial bus of the second transmission speed.

* * * * *